Nov. 26, 1929.  R. B. CHILLAS, JR  1,736,845
FRACTIONAL DISTILLATION APPARATUS
Filed Feb. 25, 1926
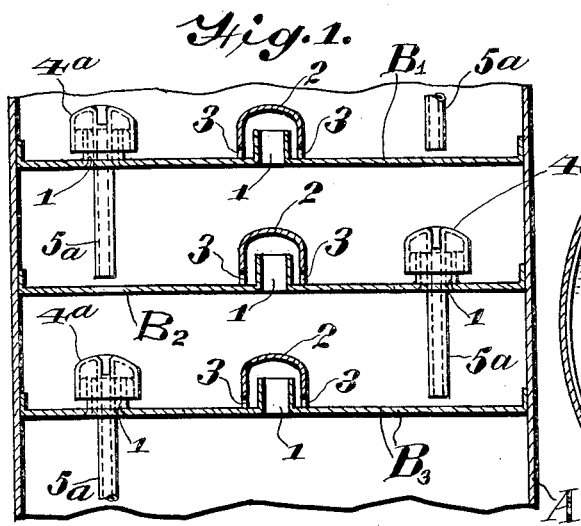
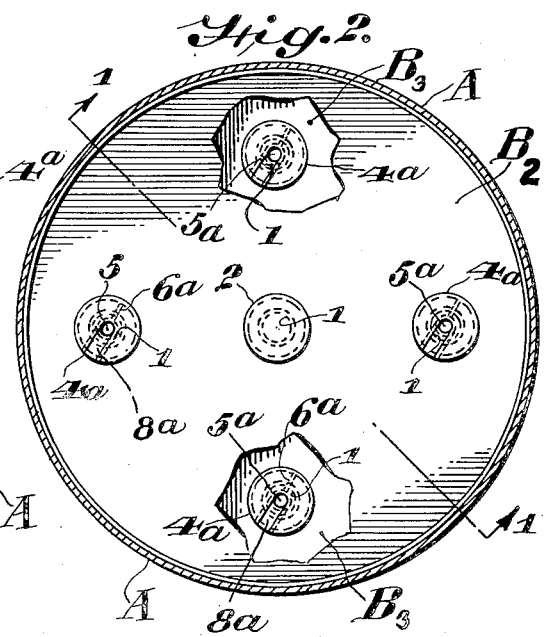
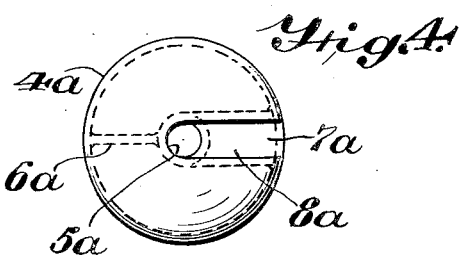
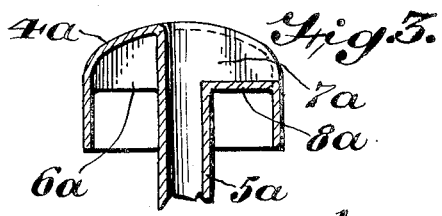
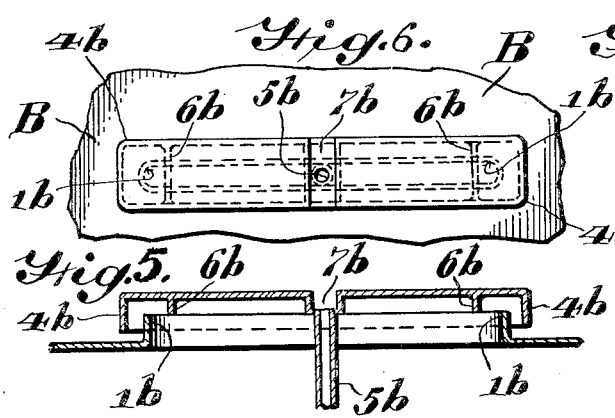
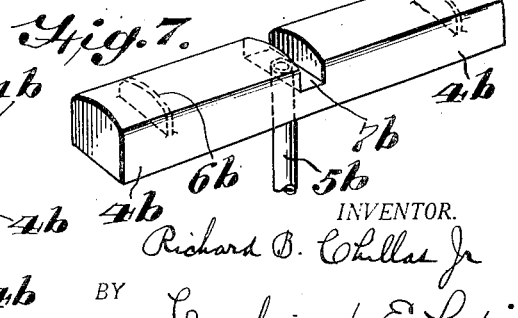
INVENTOR.
Richard B. Chillas Jr
BY Cornelius D. Ehret
his ATTORNEY.

Patented Nov. 26, 1929

1,736,845

UNITED STATES PATENT OFFICE

RICHARD B. CHILLAS, JR., OF PHILADELPHIA, PENNSYLVANIA, ASSIGNOR TO THE ATLANTIC REFINING COMPANY, OF PHILADELPHIA, PENNSYLVANIA, A CORPORATION OF PENNSYLVANIA

FRACTIONAL-DISTILLATION APPARATUS

Application filed February 25, 1926. Serial No. 90,529.

My invention relates to apparatus for fractional distillation and comprehends improvements in the construction of plates and of bubbler caps used in connection therewith.

In accordance with my invention, a bubbler cap comprised in a bubbler plate is formed with an orifice for the downward passage of the refluxing liquid, and more particularly the bubbler cap comprises a pipe or conduit preferably formed integrally therewith through which the refluxing liquid pursues its downward course, as aforesaid.

When utilizing one or more bubbler caps of the character aforesaid, the plate construction is simplified whereby the usual down flow pipes on the plate may be omitted. Greater flexibility and improved results are obtained since the bubbler caps including the down flow pipe may be interchangeable with the ordinary type of bubbler cap and hence the regions wherein there is discharge of refluxing liquid onto the bubbler plate below may be regulated or changed at will.

For an understanding of my invention and for an illustration of some of the forms it may take, reference is to be had to the accompanying drawing, in which:

Fig. 1 is a vertical sectional view of apparatus constructed in accordance with my invention taken on line 1—1 of Fig. 2.

Fig. 2 is a plan view of one of the bubbler plates shown in Fig. 1 with parts thereof broken away to illustrate the plate beneath.

Fig. 3 is a vertical sectional view of a combined bubbler cap and down flow pipe.

Fig. 4 is a plan view of the structure shown in Fig. 3.

Fig. 5 is a vertical sectional view of a modified form of my invention.

Fig. 6 is a plan view of the structure shown in Fig. 5.

Fig. 7 is a perspective view of the combined bubbler cap and down flow pipe shown in Figs. 5 and 6.

Within the fractionating column A are positioned a plurality of bubbler plates $B^1$, $B^2$ and $B^3$, each having, in the example shown, three vapor uptakes 1, Figs. 1 and 2. As illustrated, column A is round or cylindrical. It shall be understood, however, that the column may be square or of other suitable configuration. The bubbler plates are secured in any convenient or desired manner to the column in suitable spaced relation.

Some of the vapor uptakes 1 are covered by the usual type of bubbler caps 2 each comprising, if desired, the lower notched peripheral edge 3 allowing the vapors to pass into the layer of refluxing liquid on a bubbler plate. Other vapor uptakes 1 are covered by bubbler cap structures $4^a$ constructed in accordance with my invention. Cap structures of this character constitute a combined bubbler cap and downflow pipe or conduit and may assume a variety of forms.

In Figs. 3 and 4, I have illustrated a form of my invention in which the bubbler cap structure $4^a$ is suitably shaped to form a channel $7^a$ opening into the downflow pipe $5^a$. Cap structure $4^a$ may be provided interiorly thereof with the fin or lug $6^a$, which with the channel floor $8^a$ of channel $7^a$, may engage the top of a vapor uptake to support the cap structure. Or, bubbler cap structure $4^a$ may be otherwise suitably supported. With this construction, the level of the refluxing liquid on a bubbler plate is defined by the height of channel floor $8^a$ thereabove.

In Figs. 5, 6 and 7, I have illustrated another modified form of my invention in which the cap structure constitutes a combined bubbler cap and downflow pipe suitable for use with long narrow vapor uptakes. An uptake of this character may be formed by the adjacent vertical walls of spaced receptacles containing refluxing liquid as disclosed in my co-pending application Serial No. 57,912, filed September 22, 1925. In the example shown, a bubbler plate B comprises a long narrow vapor uptake $1^b$ covered by a bubbler cap structure $4^b$ suitably shaped to form a channel $7^b$ having a downflow pipe $5^b$ communicating therewith. Cap structure $4^b$ may be suitably supported or retained above the vapor uptake $1^b$, as by the fins or lugs $6^b$.

The operation of a column using plates fitted with my novel type of bubbler cap structure is as follows:

Vapor introduced into the column A from a still or other suitable heating structure, passes upwardly through the vapor uptakes 1, being forced by the bubbler caps to pass under the lower edge thereof and to bubble through the pool of liquid maintained on each plate. The refluxing liquid passes downwardly through the downflow pipes in the bubbler caps and is discharged on the plate beneath in such a way that a liquid seal is maintained at the bottom of the pipes and the upward flow of vapor through these pipes is thereby prevented.

While in the example given the plates are described as each having only three bubbler caps, two of which include downflow pipes in accordance with my invention, it will be understood that any number of bubbler caps may be used one or more of which have a downflow pipe as a part thereof.

Nor is the relative position of the two types of bubbler caps limited as shown, for my novel type of bubbler cap including a down flow pipe permits considerable flexibility of operation, for by changing the position and number of the bubbler caps carrying downflow pipes, the length of path over which the reflux flows and the quantity of reflux delivered at the several points on each plate may be controlled as desired. This flexibility is not obtainable with the type of fractionating plate and bubbler cap heretofore used.

The types of bubbler cap including a downflow pipe above described is particularly advantageous for plates constructed in accordance with my aforesaid co-pending application Serial 57,912, in which the plates are constructed of a plurality of independent pan-like sections, for, with the combined bubbler cap and downflow pipe, it is unnecessary to provide a separate downflow section, thus permitting the use of uniform interchangeable pans.

What I claim is:

1. In an apparatus of the class described, a bubbler plate having an opening therein, a bubbler cap extending over said opening and having an opening in its top, a pipe extending downwardly from said second mentioned opening to a point below said bubbler plate, said cap having a channel extending from the side thereof to said pipe for conducting liquid from a point below the top of said bubbler cap to said pipe.

2. In a combined bubbler cap and downflow pipe, a member adapted to extend over an opening in a bubbler plate and whose length is greater than its width, said member having a channel extending the width thereof and having an opening in the bottom of said channel, and a pipe extending downwardly from said opening.

3. In a combined bubbler cap and downflow pipe, a member adapted to extend over an opening in a bubbler plate and whose length is greater than its width, lug structure within said member, said member having a channel extending the width thereof and having an opening in the bottom of said channel, and a pipe extending downwardly from said opening.

RICHARD B. CHILLAS, Jr.